(12) United States Patent
Merian

(10) Patent No.: X2248
(45) Date of Patent: Jan. 4, 1815

(54) BUTTONS, TURNING & POLISHING LATHE

(76) Inventor: Lauren Merian

Lauren Merriam
Letters Patent.

The Schedule referred to in these Letters Patent and making part of the same Containing a description in the words of the said Lauren Merriam himself of his improvement in the Lathe for turning & polishing soft metal and composition buttons.

The improvement consists in placing the pin which holds the button in the Lathe) in such a situation that it may be trust into the hole in the mandril, and through the eye of the button, to secure the button in the Lathe, and taken out of the Eye of the button to release the button from the Lathe, by the use of Machinery, obviating the necessity of putting the hand to the pin during the operation.

The improvement further consists in effecting the object of turning and polishing buttons without the necessity of stopping or retarding the motion of the mandrel in putting in or discharging the button, the mandrel being kept in motion during the whole operation. The Lathe is Constructed in manner following viz; The mandrel is made of materials length & diameter as usual. The mandrel is placed or secured in the Lathe by studs or puppets (as they are commonly called) in the method which is commonly used in button and other turning turning Lathes that part of the mandrel which projects to the right of right hand stud or puppet is formed round straight of equal diameter, and well polished, that being the end to which the button is secured for turning and polishing). At the extreme end of the mandrel is made a cavity or mortise of proper depth, and shape to receive the eye of the button. When the Lathe is to be used for turning wire eye buttons there must be a concavity in the end of the mandrel to admit the bulb around the Eye of the button when the Lathe is used for turning or finishing other buttons there need be nothing else in the end of the mandrel than a simple mortise to receive the eye of the button.

A little back from the end of the mandrel is a hole quite through the mandrel, which hole receives the pin which confines the button in the mandrel, the hole is made so far back from the end of the mandrel and in such direction through the same as that the pin when trust in passes through the eye of the button and holds the button close and firm to the end of the mandrel.

The pin is of a length about equal to two thirds the diameter of the mandrel and is made tapering coming nearly to a point The pin is firmly attached to a shank or <u>hold fast</u> which shank or hold fast is constructed as follows (Viz) The shank or hold fast is about one inch and two thirds of an inch in length made to crook in the middle at an angle or elevation of about fifty degrees the pin is rivitted through one end of the shank or hold fast in such manner as to form rather an obtuse angle with that part of the hold fast to which it is riveted. On the same side of the hold fast from which the pin projects is attached a shoulder or tenon which shoulder or tenon projects from the outward or crooked side of the hold fast the shoulder or tenon projects from the hold fast a little forward of the angle that is to say between the angle and the pin but nearest to the angle.

The shoulder or tenon is let into the mandrel by a mortise made in the mandrel so far back from the end of the mandrel as to permit the pin to enter the pin hole when the shoulder or tenon on the hold fast is put into the mortise made in the mandrel the mortise in the mandrel is made on a line with the pin hole when the shoulder or tenon on the hold fast is entered in the mortise a pin of steel is put through the mandrel at the mortise (that is to say) through the lips of the mortise made in the mandrel the pin also passes through the shoulder or tenon on the hold fast so as to form a pivot or axle upon which the shoulder or tenon on the hold fast enters the mandrel in such manner as not to rest upon the mandrel by about the tenth part of an inch being kept up from the mandrel by the steel pin or pivot. The shank or hold fast when thus put into the mandrel rises from the mandrel at an angle of about sixty degrees elevation (that is to say) that part of the hold fast which is back of the angle or crook in the hold fast, that part of the hold fast forward of the angle or crook in the same lying nearly along upon the mandrel back or to the left of the pin hole in the mandrel. The pin which enters the eye of the button should be made of Steel the shank or hold fast with its shoulder or tenon should be made of steel or Iron. In that end of the shank or hold fast which rises from the mandrel (viz) the end to the left when the hold fast is put to its place is mad a slit or opening which slit or opening receives the end of a thin piece of iron or other firm metal which thin piece of metal is secured in the slit or opening in the end of the shank or hold fast by means of a steel rivet which rivet passes through the chops of the slit or opening & also through the thin piece of metal when entered in the slit or opening forming a joint the thin piece of metal turning upon the rivet. The other end of the thin piece of metal (or connecter as it may be called) is connected by a joint to a slip collar or collet, which collar or collet embraces the mandrel back or to the left of the mortise in the mandrel made to receive the shoulder or tenon on the hold fast the thin piece of metal or Connector when attached to the Collar forms an angle with that part of the hold fast to which it is attached.

The Slip collar or collet is made of brass, copper or iron about an inch in length and nicely fitted on to the mandrel in such manner as to be moveable back & forth the slip collar must be sufficiently thick as to permit the grooves hereafter described to be made therein without
to much weaking the collar.

The thin piece of metal or connector
is attached to the slip collar by a joint formed by
putting a wire around that end of the slip collar
which is next to the hold fast the wire is put around
in a channel or groove cut in the collar for that
purpose upon that edge of the collar where the joint
of the collar and connector is formed is made a
slit or opening to receive the end of the connector.

(Imperfect)

790

Received and recorded anew Dec. 17th 1851

No drawings

THE NATIONAL ARCHIVES OF THE UNITED STATES

2—328 a.

DRAFTSMAN'S DIVISION.

*All communications should be addressed to*
"The Commissioner of Patents,
Washington, D. C."

*DEPARTMENT OF THE INTERIOR,*

United States Patent Office.

*Washington, D. C.,* ......................, 189..

*SIR:*

*The printed* copies ...................... *of Patent No.* L. Merriam, Jan. 4, 1815 are *exhausted.*

*As soon as reprinted a copy will be mailed you to complete your order.*

*By direction of the Commissioner:*

*Very respectfully,*

......................

*Chief Clerk.*

3143b6–97–5m